Patented Jan. 2, 1945

2,366,306

UNITED STATES PATENT OFFICE 2,366,306

POLYMERIZATION OF VINYL HALIDES

Claude H. Alexander and Harold Tucker, Cuyahoga Falls, Ohio, assignors to The B. F. Goodrich Company, New York, N. Y., a corporation of New York No Drawing. Application January 25, 1940, Serial No. 315,574

11 Claims. (Cl. 260—88)

This invention is concerned with the polymerization of vinyl halides, and has as its principal object the provision of new and improved catalysts for said polymerization.

It is well known that vinyl halides may be polymerized in the presence of small amounts of oxidizing catalysts to form plastic polymers. Dibenzoyl peroxide is the particular catalyst which has been nearly universally employed to effect this polymerization.

We have now discovered that if vinyl halides are polymerized in the presence of diacyl peroxides derived from monocarboxylic acids containing between 4 and 10 carbon atoms inclusive, the time necessary to effect the polymerization is greatly reduced and polymers having improved properties are formed.

The catalysts of this invention are applicable to any of the well known methods of polymerizing vinyl halides such as homogeneous polymerization, emulsion polymerization, polymerization in solution, etc. The catalysts may be employed to accelerate the rate of polymerizations carried out by means of heat or actinic radiation.

The method of this invention is applicable to any vinyl halide or to any mixture of polymerizable monomers comprising principally a vinyl halide. Thus, it is within the scope of this invention to polymerize vinyl chloride, vinyl bromide, or a mixture of a vinyl halide with minor proportions of vinyl acetate, vinyl chloracetate, vinyl formate, vinylidene chloride, vinyl cyanide, methyl vinyl ketone, methyl acrylate, methyl methacrylate, etc.

The catalysts employed in performing the polymerization herein described are diacyl peroxides derived from monocarboxylic acids, that is, fatty acids, containing between 4 and 10 carbon atoms inclusive. The preferred peroxides are derived from straight-chain, saturated acids and accordingly include dibutyryl peroxide, dicaproyl peroxide, dicaprylyl peroxide, dipelargonyl peroxide, and dicapryl peroxide. Peroxides derived from unsaturated acids such as crotonic acid and 2-hexenoic acid, and branch-chain acids such as isobutyric acid and isovaleric acid may, however, be employed as catalysts with good results. Mixed peroxides such as caprylyl capryl peroxide, caproyl caprylyl peroxide, etc., may also be employed. The catalysts of this invention may be prepared by any of the well known methods for preparing peroxides. Thus, the reaction of caprylyl chloride and sodium peroxide produces caprylyl peroxide which below 13° C. is a white, waxy, crystalline solid. Although this peroxide and the other peroxides of this invention are surprisingly stable materials and no special precautions to preserve them are necessary if they are to be used soon after they are prepared, they are preferably stored at low temperatures. The fatty acids are ordinarily obtained from natural fats as mixtures rather than as pure compounds. These mixtures of fatty acids containing between 4 and 10 carbon atoms may accordingly be converted into peroxides and employed as catalysts without isolation of the individual compounds.

When the catalysts of this invention are employed in the emulsion polymerization of vinyl chloride, compositions of the following type may be employed:

| | Parts by weight |
|---|---|
| Vinyl chloride | 2,500 |
| Catalyst | 25 |
| Emulsifying agent | 40 |
| Buffer | 20 |
| Water | 3,700 |

Any of the conventional buffers such as sodium acid phosphate or tartrate may be employed to maintain the hydrogen ion concentration substantially constant during the polymerization. Synthetic saponaceous emulsifying agents such as the alkali metal salts of sulfated fatty acid esters, of sulfated fatty acid amides, of secondary alcohol sulfates, of sulfated esters of alcohols containing between 12 and 18 carbon atoms, and of mono- and dialkyl substituted aromatic sulfonates may be employed. One satisfactory material is sold under the name "Aquarex D" and is believed to consist largely of sodium lauryl sulfate.

When an emulsion of the above type containing dicaprylyl peroxide as the catalyst was placed in a 2 gal. glass-lined bomb and heated for 40 hours at 40° C., an 89% yield of polyvinyl chloride was obtained. When dibenzoyl peroxide is employed in the same emulsion instead of dicaprylyl peroxide, it requires 65 hours to obtain an 89% yield. When other catalysts were employed in the same emulsion in varying proportions based on the vinyl chloride and the emulsion was heated for varying times at 40° C., the yields recorded in the following table were obtained:

| Catalyst | Amount of catalyst used | Time of polymerization | Yield |
|---|---|---|---|
| | Percent | Hours | Percent |
| Dibutyryl peroxide | 1 | 41 | 89 |
| Dicaproyl peroxide | 1 | 24 | 92 |
| Do. | 0.25 | 65 | 90 |
| Dicaprylyl peroxide | 0.5 | 65 | 92.5 |
| Dipelargonyl peroxide | 1 | 65 | 90 |

The catalysts of this invention, particularly dicaproyl peroxide and dicaprylyl peroxide, not only effect polymerization in a fraction of the time required for polymerization with dibenzoyl peroxide, but may be used in considerably smaller proportions than dibenzoyl peroxide. While dibenzoyl peroxide is ordinarily used in proportions of from ⅔–1% based on the vinyl chloride in emulsion polymerizations, dicaprylyl peroxide may be employed in proportions as low as 1/10–1/5% with equivalent results. When high yields of insoluble polymers are desired, it is desirable to employ the catalyst in these very low proportions, since the more rapid polymerization effected by higher proportions of the catalysts of this invention promotes the formation of more soluble polymers.

The polymers prepared with the diacyl peroxides of this invention are more stable, form lighter colored compositions, and have better electrical properties than polymers made in the presence of dibenzoyl peroxide. When plasticized, heat-molded compositions were prepared from gamma polyvinyl chloride formed in the presence of dicaprylyl peroxide, it was observed that the products were light amber instead of the dark red or brown color ordinarily characteristic of compositions prepared by plasticizing and heat-molding polymers prepared in the presence of dibenzoyl peroxide. The polymers of this invention also liberate hydrogen chloride to a much lesser extent when heated, and have improved dielectric properties which makes them more valuable as insulation. Although the reasons for the improved stability of the polymers of this invention are not fully understood, the absence of the acidic decomposition products of the dibenzoyl peroxide is believed to be at least partly responsible for the advantages enjoyed by polymers formed in the presence of the diacyl peroxides of this invention.

Although we have herein disclosed specific embodiments of our invention, we do not intend to limit the invention solely thereto, for many variations and modifications are within the spirit and scope of the invention as defined in the appended claims.

We claim:

1. The method which comprises polymerizing a vinyl halide in the presence of a diacyl peroxide derived from a fatty acid containing between 4 and 10 carbon atoms inclusive.

2. The method which comprises polymerizing a mixture of polymerizable monomers comprising principally vinyl chloride in the presence of a diacyl peroxide derived from a fatty acid containing between 4 and 10 carbon atoms inclusive.

3. The method which comprises polymerizing a vinyl halide in the presence of a diacyl peroxide derived from a straight-chain, saturated fatty acid containing between 4 and 10 carbon atoms inclusive.

4. The method which comprises polymerizing an emulsion containing vinyl chloride as the principal polymerizable constituent in the presence of a diacyl peroxide derived from a fatty acid containing between 4 and 10 carbon atoms inclusive.

5. The method which comprises polymerizing an emulsion containing vinyl chloride as the sole polymerizable constituent in the presence of a diacyl peroxide derived from a fatty acid containing between 4 and 10 carbon atoms inclusive.

6. The method which comprises polymerizing vinyl chloride in the presence of a catalyst comprising dicaprylyl peroxide.

7. The method which comprises polymerizing vinyl chloride in the presence of a catalyst comprising dicaproyl peroxide.

8. A polyvinyl halide prepared by the polymerization of a vinyl halide in the presence of a diacyl peroxide derived from a fatty acid containing between 4 and 10 carbon atoms inclusive.

9. Polyvinyl chloride prepared by the polymerization of a vinyl chloride in the presence of a diacyl peroxide derived from a fatty acid containing between 4 and 10 carbon atoms inclusive.

10. The method which comprises polymerizing an emulsion containing vinyl chloride as the principal polymerizable constituent in the presence of dicaprylyl peroxide.

11. The method which comprises polymerizing an emulsion containing vinyl chloride as the sole polymerizable constituent in the presence of dicaprylyl peroxide.

CLAUDE H. ALEXANDER.
HAROLD TUCKER.